(12) United States Patent
Martini

(10) Patent No.: US 9,497,063 B2
(45) Date of Patent: Nov. 15, 2016

(54) MAINTAINING IP TABLES

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/280,440

(22) Filed: May 16, 2014

(65) Prior Publication Data

US 2015/0334116 A1 Nov. 19, 2015

(51) Int. Cl.
*G06F 17/00* (2006.01)
*H04L 29/06* (2006.01)
*H04L 29/12* (2006.01)

(52) U.S. Cl.
CPC ........... *H04L 29/06* (2013.01); *H04L 61/1511* (2013.01); *H04L 61/6009* (2013.01); *H04L 63/10* (2013.01); *H04L 61/2076* (2013.01)

(58) Field of Classification Search
CPC ........... H04L 61/1511; H04L 61/2076; H04L 29/12301; H04L 29/12066; H04L 63/0236; H04L 63/0263
USPC .......................... 726/1, 11–14; 709/238–245
See application file for complete search history.

(56) References Cited

U.S. PATENT DOCUMENTS

| | | | |
|---|---|---|---|
| 6,742,047 B1 | 5/2004 | Tso | |
| 7,188,138 B1 | 3/2007 | Schneider | |
| 7,194,552 B1 | 3/2007 | Schneider | |
| 7,451,234 B1* | 11/2008 | Bonner | 709/245 |
| 7,516,485 B1 | 4/2009 | Lee et al. | |
| 7,793,342 B1 | 9/2010 | Ebrahimi et al. | |
| 8,046,495 B2 | 10/2011 | Cooper et al. | |
| 8,122,493 B2* | 2/2012 | Drako et al. | 726/11 |
| 8,478,849 B2 | 7/2013 | Marl | |
| 8,549,609 B2* | 10/2013 | Horman et al. | 726/11 |
| 8,621,556 B1* | 12/2013 | Bharali et al. | 726/1 |
| 8,792,507 B2* | 7/2014 | Lee et al. | 370/401 |
| 8,977,728 B1 | 3/2015 | Martini | |
| 2001/0023459 A1* | 9/2001 | Asami | 709/245 |
| 2002/0065938 A1 | 5/2002 | Jungck | |
| 2002/0178381 A1 | 11/2002 | Lee et al. | |
| 2003/0065762 A1 | 4/2003 | Stolorz et al. | |
| 2003/0131259 A1 | 7/2003 | Barton et al. | |
| 2004/0215707 A1* | 10/2004 | Fujita | H04L 29/06 709/201 |
| 2008/0005127 A1 | 1/2008 | Schneider | |

(Continued)

OTHER PUBLICATIONS

Blue Coat White Paper (How to Gain Visibility and Control of Encrypted SSL Web Sessions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.

(Continued)

*Primary Examiner* — Christopher Revak
*Assistant Examiner* — Vadim Savenkov
(74) *Attorney, Agent, or Firm* — Fish & Richardson P.C.

(57) ABSTRACT

Data including a set of one or more resources and one or more associated IP addresses is updated based on data from a DNS server. A request is received from a client device for a resource identified by an IP address. The IP address is matched to one of the IP addresses in the set of one or more IP addresses. A particular resource associated with the matched IP address is identified. A particular network policy that applies is identified. The identified particular network policy is applied to the received request.

39 Claims, 7 Drawing Sheets

(56) References Cited

U.S. PATENT DOCUMENTS

| | | | |
|---|---|---|---|
| 2008/0040790 | A1 | 2/2008 | Kuo |
| 2008/0215718 | A1 | 9/2008 | Stolorz et al. |
| 2010/0218248 | A1 | 8/2010 | Nice et al. |
| 2010/0296445 | A1* | 11/2010 | Sarikaya et al. ............. 370/328 |
| 2011/0016145 | A1 | 1/2011 | De Lutiis et al. |
| 2011/0126277 | A1* | 5/2011 | McCann et al. ................ 726/13 |
| 2011/0153807 | A1* | 6/2011 | Vicisano ........... H04L 29/12066 709/224 |
| 2011/0153840 | A1 | 6/2011 | Narayana et al. |
| 2012/0215892 | A1* | 8/2012 | Wanser .............. H04L 61/1552 709/222 |
| 2012/0254996 | A1* | 10/2012 | Wilbourn ........... H04L 61/1511 726/22 |
| 2013/0305345 | A1* | 11/2013 | Bugenhagen ................... 726/12 |
| 2014/0164645 | A1* | 6/2014 | Palani .......................... 709/242 |

OTHER PUBLICATIONS

Burkholder, "SSL Man-in-the-Middle Attacks," *Reading Room SANS*, 2002, downloaded from the internet at: http://www.sans.org/reading_room/whitepapers/threats/ssl-man-in-the-middle-attacks_480, on May 16, 2013, 17 pages.

Cisco Systems, Inc., "ASA NGFW Service Applications Portal", 2013, downloaded from the internet at: http://asacx-cisco.com/ on Oct. 29, 2013, 3 pages.

Cisco Systems, Inc., "User Guide for ASA CX and Cisco Prime Security Manager 9.2", 2011, downloaded from the internet at: http://www.cisco.com/c/en/us/td/doc/security/asacx/9-2/user/guide/b_User_Guide_for_ASA_CX_and_PRSM_9_2.pdf on Oct. 29, 2013, 452 pages.

Faruque, "Open Source Open Standard", Sep. 28, 2012, downloaded from the internet at: http://tektab.com/2012/09/28/squid-transparent-proxy-for-https-ssl-traffic/ on Apr. 26, 2013 5 pages.

Nayak et al. "Different Flavours of Man-In-The-Middle Attack, Consequences and Feasible Solutions", $3^{rd}$ IEEE International Conference on Computer Science and Information Technology (ICCSIT), Jul. 9-10, 2010, pp. 491-495.

Rousskov , "Feature: Squid-in-the-middle SSL Bump," Apr. 20, 2012, downloaded from the internet at: http://wiki.squid-cache.org/Features/SslBump on Apr. 26, 2013, 2 pages.

Jeff Skierka Designs, "VPS Hosting", 2013, downloaded from the internet at: http://jeffskierkadesigns.com/vps-hosting/ on Oct. 29, 2013; 4 pages.

Wikipedia, "Shared Web Hosting Service", Sep. 24, 2013, downloaded from the internet at: http://en.wikipedia.org/wiki/Shared_web_hosting_service on Oct. 29, 2013, 4 pages.

Mockapetris, "Domain Names—Implementation and Specification", Nov. 1987, Network Working Group, Request for Comments: 1035 ("RFC 1035"), downloaded from the internet at: http://tools.ietf.org/pdf/rfc1035.pdf on Dec. 3, 2014, 55 pages.

Thomas, International Search Report and Written Opinion in corresponding PCT application PCT/US15/31220 mailed Aug. 17, 2015, 17 pages.

* cited by examiner

MAINTAINING IP TABLES

The present document relates to computer networking.

BACKGROUND

A computer network is a collection of computers and other hardware interconnected by communication channels that allow sharing of resources and information. Communication protocols define the rules and data formats for exchanging information in a computer network. Transport Layer Security (TLS) and Secure Socket Layer (SSL) are two examples of cryptographic communication protocols that provide communication security by allowing devices to exchange encrypted, as opposed to plaintext, messages.

SUMMARY

In one aspect, a method is performed by data processing apparatus. The method includes maintaining (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses. The method further includes receiving, from a domain name system (DNS) server, (i) fourth data that identifies a new resource, (ii) fifth data that identifies one or more new IP addresses, and (iii) sixth data that associates the new resource with one or more new IP addresses. The method further includes updating the first data, based on the fourth data, to include the new resource in the set of one or more resources. The method further includes updating the second data, based on the fifth data, to include the one or more new IP addresses in the set of one or more IP addresses. The method further includes updating the third data, based on the sixth data, to update the associations between the set of resources and the set of IP addresses. The method further includes intercepting a request from a client device on the network for a requested resource identified by a requested IP address. The method further includes determining that the requested IP address matches one of the IP addresses in the set of IP addresses. The method further includes identifying a particular resource in the set of resources that is associated with the requested IP address. The method further includes identifying a particular policy of the network that applies to the particular resource. The method further includes applying the particular policy to the request.

Implementations can include any, all, or none of the following features. To apply the particular policy to the request, the data processing apparatus are configured to inspect communication between the client and a server serving the requested resource. Only request that have an applied policy are inspected. The DNS server is hosted on the network. The DNS server is under the same administrative control as the network. The method including monitoring DNS responses; generating, from the monitored DNS responses, (i) seventh data that identifies a second new resource, and (ii) eighth data that identifies one or more second new IP addresses, and (iii) ninth data that associates the second new resource with one or more second new IP addresses; updating the first data, based on the seventh data, to include the second new resource in the set of one or more resources; updating the second data, based on the eighth data, to include the one or more second new IP addresses in the set of one or more IP addresses; and updating the third data, based on the ninth data, to update the associations between the set of resources and the set of IP addresses. The DNS responses are received from DNS servers outside of the network. The data apparatus include a plurality of hardware devices, each hardware device including a separate processor and memory unit; wherein a first hardware device is configured to: route traffic to and from client devices on the network into and out of the network; maintain (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses; receive, from a domain name system (DNS) server, (i) fourth data that identifies a new resource, (ii) fifth data that identifies one or more new IP addresses, and (iii) sixth data that associates the new resource with one or more new IP addresses; update the first data, based on the fourth data, to include the new resource in the set of one or more resources; update the second data, based on the fifth data, to include the one or more new IP addresses in the set of one or more IP addresses; update the third data, based on the sixth data, to update the associations between the set of resources and the set of IP addresses; intercept a request from a client device on the network for a requested resource identified by a requested IP address; determine that the requested IP address matches one of the IP addresses in the set of IP addresses; identify a particular resource in the set of resources that is associated with the requested IP address; identify a particular policy of the network that applies to the particular resource; and wherein a second hardware device is configured to apply the particular policy to the request. The resource is identified in the first data by the resource's Uniform Resource Locator (URL).

In one aspect, a method is performed by data processing apparatus. The method includes maintaining information includes (i) a set of one or more resources to which a network policy applies, and (ii) a set of one or more Internet Protocol (IP) addresses. Each resource is associated with one or more of the IP addresses. The method further includes receiving, from a domain name service (DNS) server, data identifying (i) a new resource, or (ii) one or more new IP addresses, or (iii) both a new resource and one or more new IP addresses. Each new IP address is associated with either a resource in the set of one or more resources, or the new resource. The method further includes updating the maintained information based on the data received from the DNS. The method further includes receiving a request from a client device on the network for a requested resource identified by a requested IP address. The method further includes determining that the requested IP address matches one of the IP addresses in the set of one or more IP addresses. The method further includes identifying a particular resource associated with the matched IP address. The method further includes identifying a particular network policy applies. The method further includes applying the identified particular network policy to the received request.

Implementations can include any, all, or none of the following features. To apply the particular policy to the request, the data processing apparatus are configured to inspect communication between the client and a server serving the requested resource. Only request that have an applied policy are inspected. The DNS server is hosted on the network. The DNS server is under the same administrative control as the network. The method including monitoring DNS responses; generating, from the monitored DNS responses, data identifying (i) a new resource, or (ii) one or more new IP addresses, or (iii) both a new resource and one or more new IP addresses, wherein each new IP address is associated with either a resource in the set of one or more resources, or the new resource; updating the maintained information based on the data generated from the DNS responses. The DNS responses are received from DNS servers outside of the network. The data apparatus include a plurality of hardware devices, each hardware device including a separate processor and memory unit; wherein a first hardware device is configured to: route traffic to and from client devices on the network into and out of the network; and maintain information including (i) a set of one or more resources to which a network policy applies, and (ii) a set of one or more Internet Protocol (IP) addresses, wherein each resource is associated with one or more of the IP addresses; receive, from a domain name service (DNS) server, data identifying (i) a new resource, or (ii) one or more new IP addresses, or (iii) both a new resource and one or more new IP addresses, wherein each new IP address is associated with either a resource in the set of one or more resources, or the new resource; update the maintained information based on the data received from the DNS; receive a request from a client device on the network for a requested resource identified by a requested IP address; determine that the requested IP address matches one of the IP addresses in the set of one or more IP addresses; identify a particular resource associated with the matched IP address; and identify a particular network policy; and wherein a second hardware device is configured to apply the particular policy to the request. The resource is identified in the information by the resource's Uniform Resource Locator (URL).

In one aspect, a system includes one or more processors configured to execute computer program instructions. The system further includes computer storage media encoded with computer program instructions that, when executed by one or more processors, cause data processing apparatus to perform operation includes maintaining (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses. The operations further include receiving, from a domain name system (DNS) server, (i) fourth data that identifies a new resource, (ii) fifth data that identifies one or more new IP addresses, and (iii) sixth data that associates the new resource with one or more new IP addresses. The operations further include updating the first data, based on the fourth data, to include the new resource in the set of one or more resources. The operations further include updating the second data, based on the fifth data, to include the one or more new IP addresses in the set of one or more IP addresses. The operations further include updating the third data, based on the sixth data, to update the associations between the set of resources and the set of IP addresses. The operations further include intercepting a request from a client device on the network for a requested resource identified by a requested IP address. The operations further include determining that the requested IP address matches one of the IP addresses in the set of IP addresses. The operations further include identifying a particular resource in the set of resources that is associated with the requested IP address. The operations further include identifying a particular policy of the network that applies to the particular resource. The system further includes applying the particular policy to the request.

Implementations can include any, all, or none of the following features. Applying the particular policy to the request includes inspecting communication between the client and a server serving the requested resource. Only request that have an applied policy are inspected. The DNS server is hosted on the network. The DNS server is under the same administrative control as the network. The operations further include monitoring DNS responses; generating, from the monitored DNS responses, (i) seventh data that identifies a second new resource, and (ii) eighth data that identifies one or more second new IP addresses, and (iii) ninth data that associates the second new resource with one or more second new IP addresses; updating the first data, based on the seventh data, to include the second new resource in the set of one or more resources; updating the second data, based on the eighth data, to include the one or more second new IP addresses in the set of one or more IP addresses; and updating the third data, based on the ninth data, to update the associations between the set of resources and the set of IP addresses The DNS responses are received from DNS servers outside of the network The data apparatus include a plurality of hardware devices, each hardware device including a separate processor and memory unit; wherein a first hardware device is configured to: route traffic to and from client devices on the network into and out of the network; maintain (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses; receive, from a domain name system (DNS) server, (i) fourth data that identifies a new resource, (ii) fifth data that identifies one or more new IP addresses, and (iii) sixth data that associates the new resource with one or more new IP addresses; update the first data, based on the fourth data, to include the new resource in the set of one or more resources; update the second data, based on the fifth data, to include the one or more new IP addresses in the set of one or more IP addresses; update the third data, based on the sixth data, to update the associations between the set of resources and the set of IP addresses; intercept a request from a client device on the network for a requested resource identified by a requested IP address; determine that the requested IP address matches one of the IP addresses in the set of IP addresses; identify a particular resource in the set of resources that is associated with the requested IP address; identify a particular policy of the network that applies to the particular resource; and wherein a second hardware device is configured to apply the particular policy to the request. The resource is identified in the first data by the resource's Uniform Resource Locator (URL).

Implementations can include any, all, or none of the following features.

The systems and processes described here may be used to provide a number of potential advantages. For example, by receiving updates from a domain name system (DNS) server, a network device can keep up-to-date mappings of domain names to internet protocol (IP) addresses. The network device may also track DNS messages on a network to keep up-to-date mappings of domain names to internet protocol (IP) addresses. These mappings may be accurate even for domain names that have many IP address and/or that share IP addresses across different domains. Changes to DNS information can be quickly reflected in the mappings.

Other features, aspects and potential advantages will be apparent from the accompanying description and figures.

DESCRIPTION OF DRAWINGS

Like reference symbols in the various drawings indicate like elements

DETAILED DESCRIPTION

A network device, such as a network gateway, can be tasked to apply policies of the network to requests on the network. However, these policies may be assigned to internet domains or subdomains, and many or all of the requests may contain only an IP address that corresponds to the domain or subdomain. In order to apply the policies to the requests, the network device can maintain and update a mapping of domains to IP addresses.

To update the mapping, one or more different techniques may be used. In one technique, the network can host a DNS server, which can be in communication with an off-network DNS server. This DNS server can be configured to generate update messages that contain IP addresses assigned domains associated with policies of the network. In another technique, the network device can monitor DNS requests and responses on the network. When a matching DNS request and response are identified, their associated domain and IP address can be added to the mapping maintained by the network device.

Figure 1:
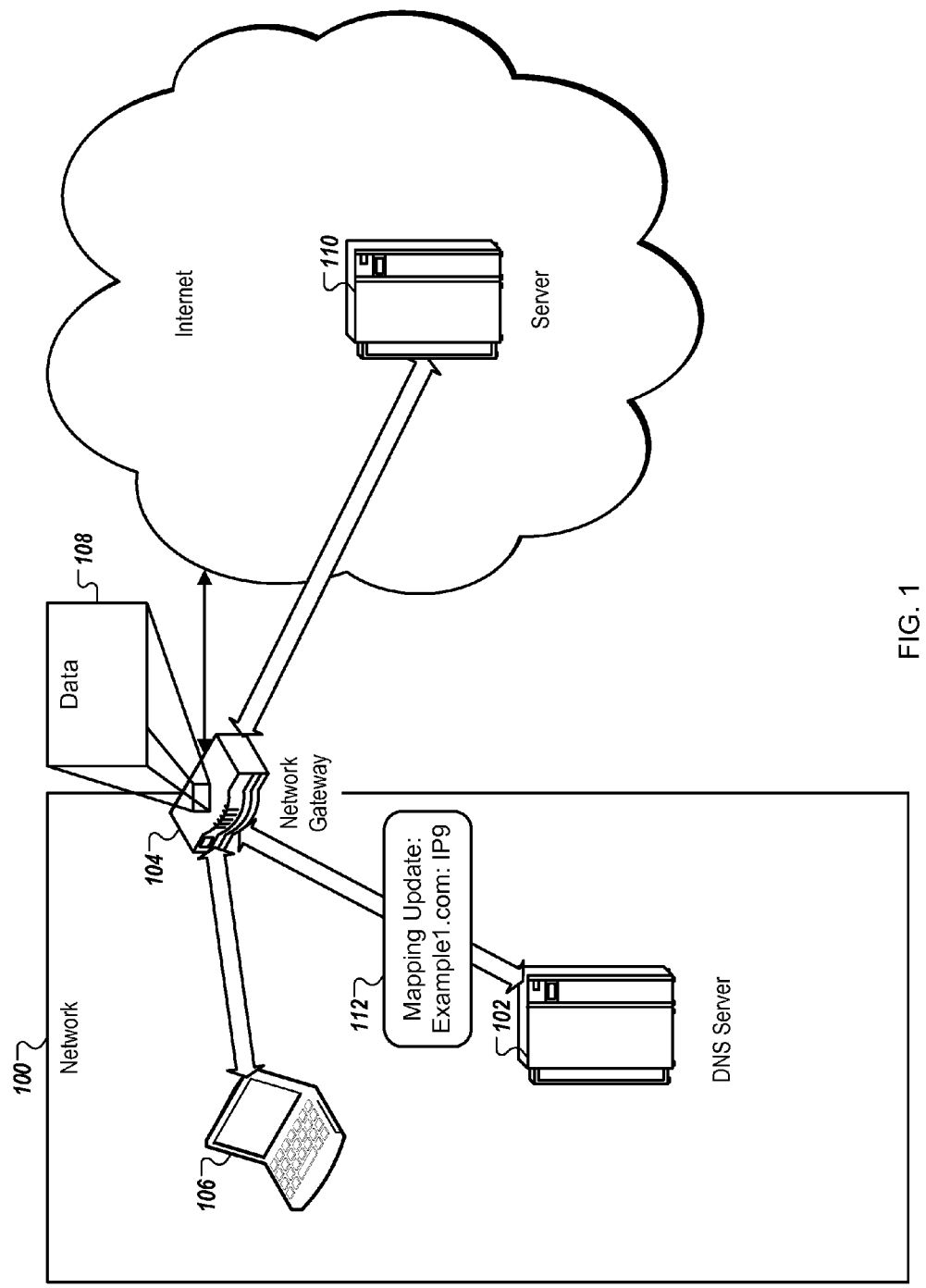
FIG. 1 is a block diagram of an example network with a DNS server.

FIG. 1 is a block diagram of an example network 100 with a DNS server 102. The network 100 includes a network gateway 104 and a client device 106, which represents any appropriate computing devices capable of browsing resources inside or outside of the network 100. While not shown for clarity's sake, the network 100 can include other elements including, but not limited to, wireless and/or wired access points, file and/or application servers, routers, and network cables, as well as additional client devices and network gateways.

The network 100 can be configured to route some or all of the traffic into and out of the network 100 through the gateway 104. For example, the gateway 104 may inspect network traffic to enforce security policies, prevent malicious software from entering the network, etc. Additionally, the gateway 104 may provide directory services for the clients of the network 100 (e.g., ApacheDS, Active Directory), may apply policies (e.g., security policies) to devices on the network 100, and may assign the client device 106 to a subnet.

To enforce the policies of the network 100, the gateway 104 may maintain data 108 that identifies a set of one or more resources to which a policy of a network applies, identifies a set of one or more stored Internet Protocol (IP) addresses, and associates each resource in the set with one or more IP addresses in the set of IP addresses. The data 108 may include, for example, iptables or other known or custom data structures. When the network gateway 104 receives a message, for example a request from the client device 106 for a resource at an IP address of the server 110, the network gateway 104 can determine if the IP addresses matches a stored IP address in the data 108. If the match is found, the network gateway 104 can identify an associated resource stored in the data 108. Once an associated resource is identified, the network gateway 104 can determine if one or more policies of the network applies to the identified resource. If there are any such policies, the network gateway 104 can apply the policies to the request. For example, a policy may require that the request be dropped or redirected to an intermediate webpage.

In some cases, port numbers are used in addition to the IP addresses. For example, some applications or services on a device are only reachable through a particular port or port range. In some cases, such as in Network Address Routing (NAT), the port is effectively part of the address of a resource.

The mapping of domain names to IP addresses is generally handled by the Domain Name System, or DNS. The DNS is a hierarchical distributed naming system for computers, services, or any resource connected to the Internet or a private network. It associates information with domain names assigned to each of the participating entities. Most prominently, it translates easily memorized domain names to the numerical IP addresses needed for the purpose of locating computer services and devices worldwide. The DNS server 102 is one of the servers of the DNS. The DNS server 102 can be configured to receive DNS requests, which contain an address of a resource. The DNS server 102 can either process the request itself to find the corresponding IP address, or pass the request to another DNS server to find the corresponding IP address. With the corresponding IP address, the DNS server 102 may then respond to the DNS request with a DNS response that has the IP address that corresponds to the address in the corresponding DNS request.

Additionally, the DNS server 102 can be configured to send a mapping update 112 to the network gateway 104. This mapping update may contain, for example, data that identifies a new resource, identifies one or more new IP addresses, and associates the new resource with one or more new IP addresses. The network gateway 104 may receive the mapping update 112 and update the data 108 to include the new resource in the set of resources, include the one or more new IP addresses in the set of one or more IP addresses, and update the associations between the set of resources and the set of IP addresses. After this updating, the network gateway 104 can use the updated data 108 to examine intercepted requests, for example to determine if a policy of the network 108 should apply to the intercepted requests.

The DNS server 102 can provide the mapping update 112 to the network gateway 104 according to any appropriate scheme. For example, the network gateway 104 may send the DNS server 104 one or more DNS requests formatted according to the traditional DNS request format. These DNS requests can include resource addresses to which a policy of the network 100 applies. In response, the DNS server 102 can respond to each DNS request with a DNS response formatted according to the traditional DNS response format. In another example, the network gateway 104 can send a message to the DNS server 102 with a list of resource addresses, and the DNS server 102 can respond with a response with a list of corresponding IP addresses. These bulk messages may be formatted according to a known or published standard, or according to a custom standard. In yet another example, the network gateway 104 can register a list of resource addresses with the DNS server 102. When the DNS server 102 interacts with one of those resource addresses (e.g., receiving an update to an associated IP address, responding to a DNS request of one of those resource addresses), the DNS server 102 can send the mapping update 112 to the network gateway 104. In yet another example, While the example shown here shows a particular configuration of elements, other configurations are possible. For example, a different data processing apparatus may be used to store the data 108 or other data. Additionally, the DNS server 102 may be outside of the network 100. The DNS server 102 may be under the same or different administrative control as the network 100.

Figure 2:
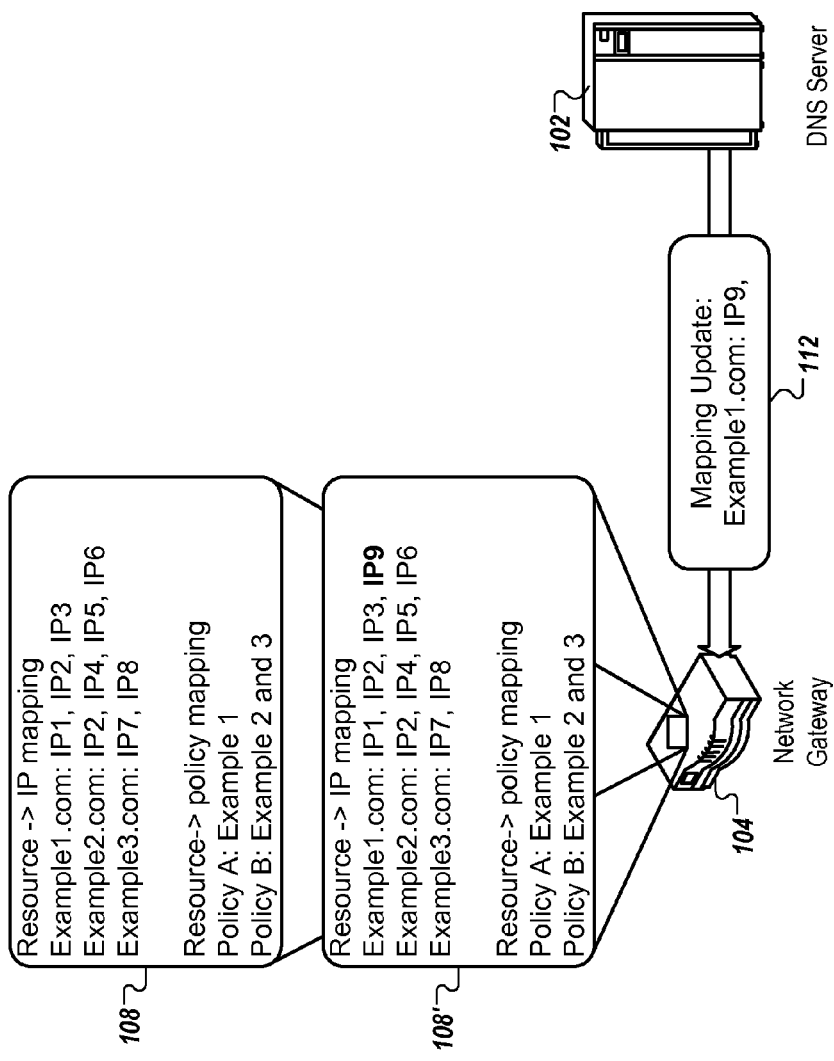
FIG. 2 is a block diagram of an example updated domain name to IP address mapping.

FIG. 2 is a block diagram of an example updated domain name to IP address mapping. For example, the data 108 of the network gateway 104 can be updated based on the mapping update 112 from the DNS server 102.

In this example, before the network gateway 104 receives the mapping update 112, the network gateway 104 maintains data 108. The data 108 includes a mapping of resources to IP addresses, including a mapping of "Example1.com" to the IP addresses IP1, IP2, and IP3. The DNS server 102 can send a mapping update 112 to the network gateway 104. The mapping update 112 can include a single domain name, "Example1.com" and a single corresponding IP address, IP9.

The network gateway 104 can receive the mapping update 112 and modify the data 108 into data 108' based on the mapping update 112. In this example, the network gateway 104 can add, to the list of IP addresses associated with "Example1.com," the IP address IP9. For purposes of readability, the IP9 in the data 108' has been highlighted.

In other examples, other configurations are possible. For example, the mapping update 112 may include more than one IP address for a particular resource address and/or the mapping update 112 may include more than one resource address, each with their own or shared IP addresses.

In some configurations, the mapping update 112 may include expired mappings. That is, the mapping update 112 may also or alternatively include data identifying mappings that are no longer valid. In response to receiving such a mapping update 112, the network gateway 104 can update the data 108 by removing an IP address from the list of IP addresses associated with a resource address.

The network gateway 104 may also update the data 108 based on other inputs. For example, the network gateway 104 may monitor DNS requests and responses to identify resource address to IP address mappings. In another example, the network gateway 104 may delete mappings that are older than a threshold age.

Figure 3:
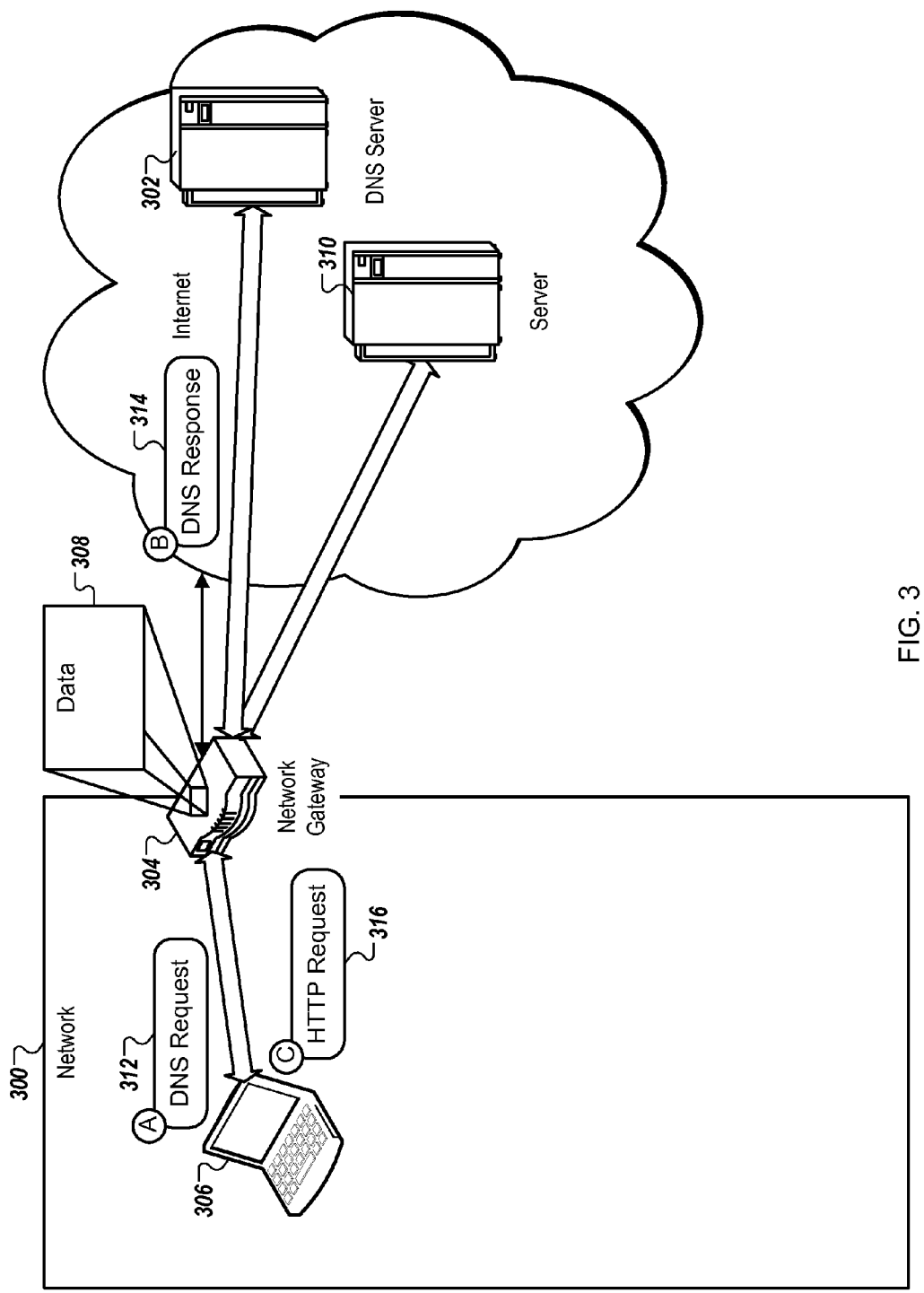
FIG. 3 is a block diagram of an example network and a remote DNS server.

FIG. 3 is a block diagram of an example network 300 and a remote DNS server 302. The network 300 includes a network gateway 304 and a client device 306, which represents any appropriate computing devices capable of browsing resources inside or outside of the network 300. While not shown for clarity's sake, the network 300 can include other elements including, but not limited to, wireless and/or wired access points, file and/or application servers, routers, and network cables, as well as additional client devices and network gateways.

The network 300 can be configured to route some or all of the traffic into and out of the network 300 through the gateway 304. For example, the gateway 304 may inspect network traffic to enforce security policies, prevent malicious software from entering the network, etc. Additionally, the gateway 304 may provide directory services for the clients of the network 300 (e.g., ApacheDS, Active Directory), may apply policies (e.g., security policies) to devices on the network 300, and may assign the client device 106 to a subnet.

To enforce the policies of the network 300, the gateway 304 may maintain data 308 that identifies a set of one or more resources to which a policy of a network applies, identifies a set of one or more stored Internet Protocol (IP) addresses, and associates each resource in the set with one or more IP addresses in the set of IP addresses. When the network gateway 304 receives a message, for example a request from the client device 306 for a resource at an IP address of the server 310, the network gateway 304 can determine if the IP addresses matches a stored IP address in the data 308. If the match is found, the network gateway 304 can identify an associated resource stored in the data 308. Once an associated resource is identified, the network gateway 304 can determine if one or more policies of the network applies to the identified resource. If there are any such policies, the network gateway 304 can apply the policies to the request. For example, a policy may require that the request be dropped or redirected an intermediate webpage.

The DNS server 302 is one of the servers of the DNS. The DNS server 302 can be configured to receive DNS requests, which contain an address of a resource. The DNS server 302 can either process the request itself to find the corresponding IP address, or pass the request to another DNS server to find the corresponding IP address. With the corresponding IP address, the DNS server 302 may then respond to the DNS request with a DNS response that has the IP address that corresponds to the address in the corresponding DNS request.

The network gateway 104 can monitor DNS traffic between the client 306 and the DNS server 302, for example in order to update the data 108. For example, the client 306 may generate a DNS request 312 for a resource at a domain name associated with the server 310. The client 306 can send the DNS request 312 to the network gateway 304. The network gateway 304 can examine the DNS request 312 and determine that the contained domain name is associated with a policy of the network. The network gateway 304 can route the DNS request 312 to the DNS server 302 which can, in response, generate a DNS response 314 that contains an IP address of the server 310. The network gateway 304 can receive the DNS response 314 and store, in the data 108, the domain name of the DNS request 312 and the IP address of the DNS response 314. The network gateway 304 can send the DNS response 314 to the client 308. The client 308, after receiving the DNS response 314, can generate a hypertext transfer protocol (HTTP) request 316. The HTTP request 316 can include the IP address contained in the DNS response 314, the same IP address that the network gateway 304 may have added to the data 108.

The client 306 can send the HTTP request 316 to the network gateway 304 to route the HTTP request 316 to the server 310. The network gateway 304 can, before routing the HTTP request 316 to the server 310, examine the HTTP request 316 to determine if a policy of the network 300 applies to the HTTP request 316. For example, the network gateway 304 can compare the IP address of the HTTP request 316 to the IP addresses stored in the data 308. If the IP address matches, the network gateway 304 can identify one or more resource names associated with the IP address. From the identified resource names, the network gateway 304 can identify one or more policies of the network 300 and apply the identified policies to the HTTP request 316. In some example, these policies may include logging the HTTPs request 316, modifying a portion of the HTTP request 316, redirecting the HTTP request 316, or any other appropriate action.

While the example shown here shows a particular configuration of elements, other configurations are possible. For example, a different data processing apparatus may be used to store the data 308 or other data. Additionally, the DNS server 302 may be inside of the network 300. The DNS server 302 may be under the same or different administrative control as the network 300.

Figure 4:
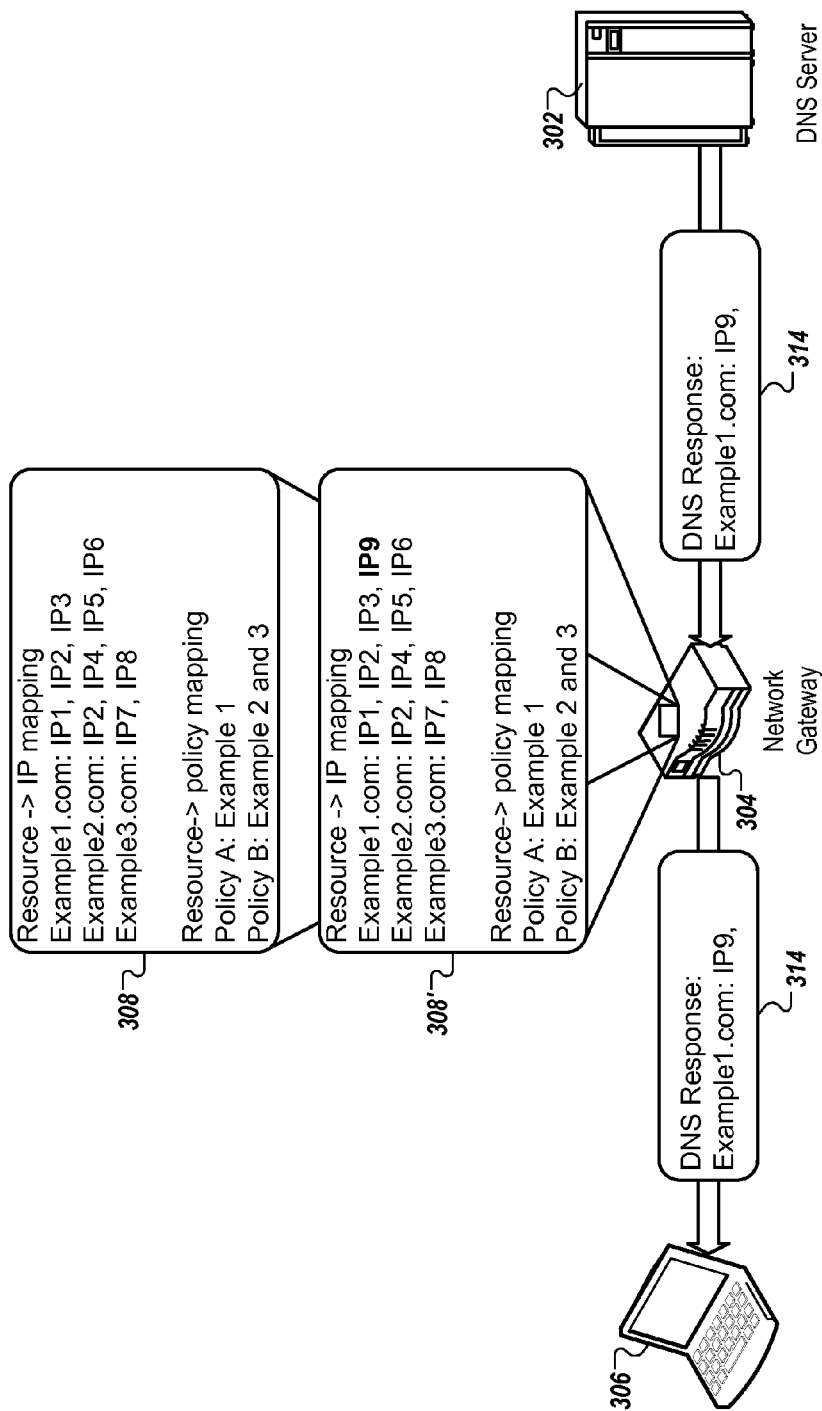
FIG. 4 is a block diagram of an example updated domain name to IP address mapping.

FIG. 4 is a block diagram of an example updated domain name to IP address mapping. For example, the data 308 of the network gateway 304 can be updated based on the DNS response 314 from the DNS server 102.

In this example, before the network gateway 304 receives the DNS response 314, the network gateway 304 maintains data 308. The data 308 includes a mapping of resources to IP addresses, including a mapping of "Example1.com" to the IP addresses IP1, IP2, and IP3. The DNS server 302 can send DNS response to the client 306 via the network gateway 304. The DNS response 314 can include a single domain name, "Example1.com" and a single corresponding IP address, IP9.

The network gateway 304 can receive the DNS response 314 and modify the data 308 into data 308' based on the DNS response 314. In this example, the network gateway 304 can add, to the list of IP addresses associated with "Example1.com," the IP address IP9. For purposes of readability, the IP9 in the data 308' has been highlighted.

In other examples, other configurations are possible. In this example, the DNS response 314 is used to update the data 308 and the DNS request 312 is not used. However, in some other examples, both the DNS request 312 and the DNS response 314 may be used. In another example, a service other than the DNS is used to discover mappings between resource addresses and IP addresses, and messages of that resource may be used.

Figure 5:
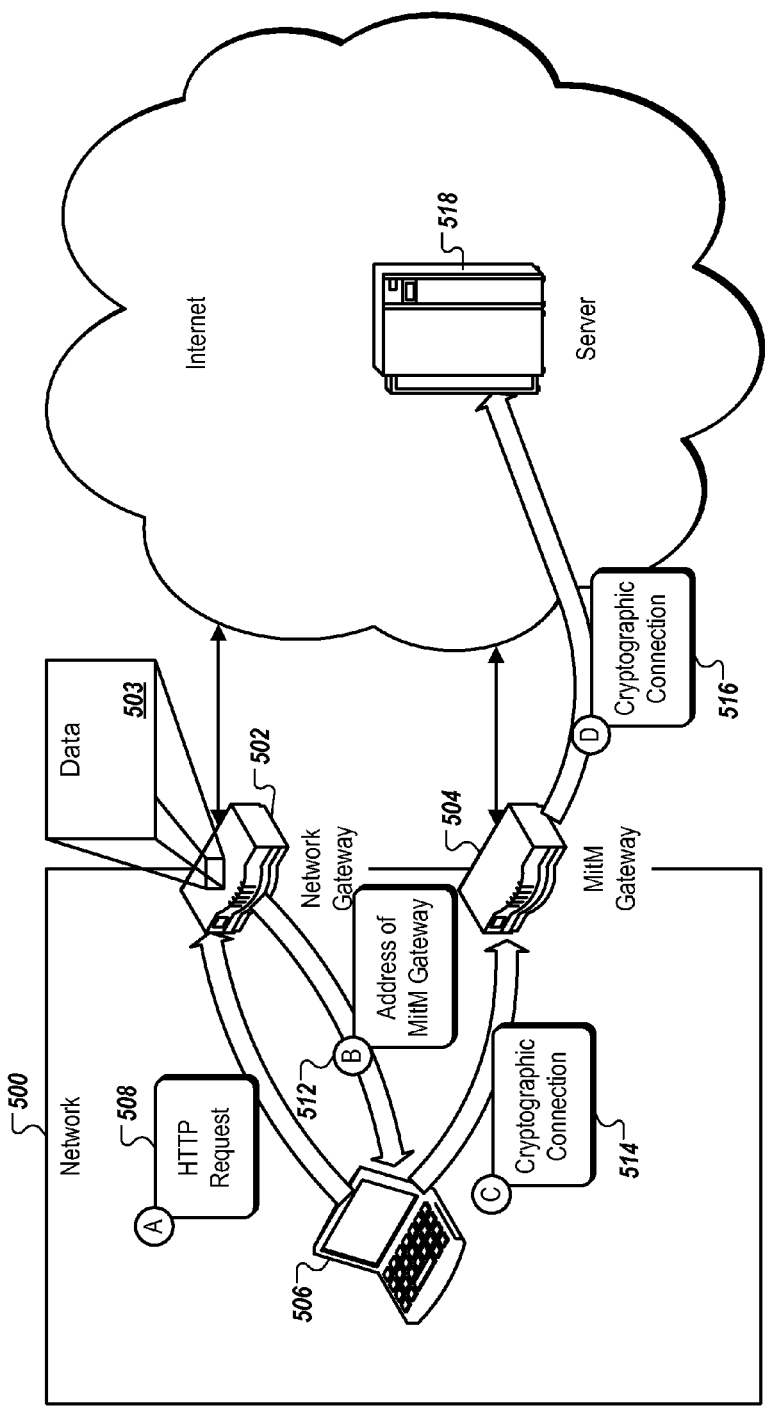
FIG. 5 is a block diagram of an example network that is applying a policy to a request.

FIG. 5 is a block diagram of an example network 500 that is applying a policy to a request. The example network 500 applies some policies of the network 500 by routing some network traffic through a man-in-the-middle (MitM) gateway. Other configurations for applying policies of networks are possible, including those that do not use a MitM gateway.

The network 500 includes a network gateway 502 and a MitM gateway 504. Also shown in the network 500 is a client device 506, which represents any appropriate computing device capable of browsing resources outside of the network 500. While not shown for clarity's sake, the network 500 can include other elements including, but not limited to, wireless and/or wired access points, file and/or application servers, routers, and network cables, as well as additional client devices 506, network gateways 502, and/or MitM gateways 504.

The network 500 can be configured to route some or all of the messages addressed outside the network to the network gateway 502. The network gateway 502 can inspect the messages and, optionally, modify or drop some messages. For example, the network gateway 502 may be configured to prevent traffic flow from a particular class of application (e.g., chat, files sharing). The network gateway 502 may also be configured to intercept messages intended for a recipient outside of the network 500 and reply directly. This process is sometimes referred to as spoofing.

For example, the network gateway 502 may intercept and examine a HTTP request 508 from the client device 506 that is addressed, by IP address, to a resource on the server 518.

Based on, for example, data 503, the network gateway 502 may determine that a policy of the network 500 applies to the HTTP request 508. The data 503 may, for example, identify a set of one or more resources to which a policy of a network 500 applies, identify a set of one or more stored Internet Protocol (IP) addresses, and associate each resource in the set with one or more IP addresses in the set of IP addresses.

In response to determining that a policy of the network 500 applies to the HTTP request 508, the network gateway 502 may issue a redirect with the address of the MitM gateway 504 to the client device 506. Many types of redirections are possible, including but not limited to 402 HTTP redirects, server-side scripting, frame redirects, and Apache mod_rewrites.

The network gateway 502 may make the determination to pass communication through the MitM gateway 504 based on security policies or concerns as applied to the network 500. While passing communication through the MitM gateway 504 may provide some other benefits (e.g., caching of frequently visited resources or to reduce bandwidth usages), the network gateway 502 may be conjured to primarily, exclusively, or only partially account for security considerations of passing communication through the network gateway 502 or the MitM gateway 504.

The client device 506, upon receiving the MitM gateway address 512, can initialize a connection, such a cryptographic connection 514, with the MitM gateway 504 at the MitM gateway address 512. The cryptographic connection 514 may be an SSL, TLS, or any other appropriate cryptographic session. The MitM gateway 504 may then initialize another cryptographic connection 516 with the server 518 that hosts the resource in the HTTP request 508.

Once the cryptographic connections 514 and 516 are established, the client device 506 and the server 518 may communicate with each other. In this communication, the MitM gateway 504 may act as a proxy of the server 518 for the client device 506 and as a proxy of the client device 506 for the server 518. The MitM gateway 504 is thus able to receive an encrypted message from the client device 506, decrypt the message, inspect the message, optionally alter or drop the message, encrypt the possibly altered message into a second encrypted form, and pass the message to the server 518. The MitM gateway 504 may perform the same type of reception, decryption, inspection, alteration or drop, encryption, and passage with messages from the server 518 to the client device 506. The MitM gateway 504 may sometimes be referred to by other terms including, but not limited to, a reverse proxy, intercepting proxy, accelerator, accelerating proxy, and transparent proxy.

Figure 6:
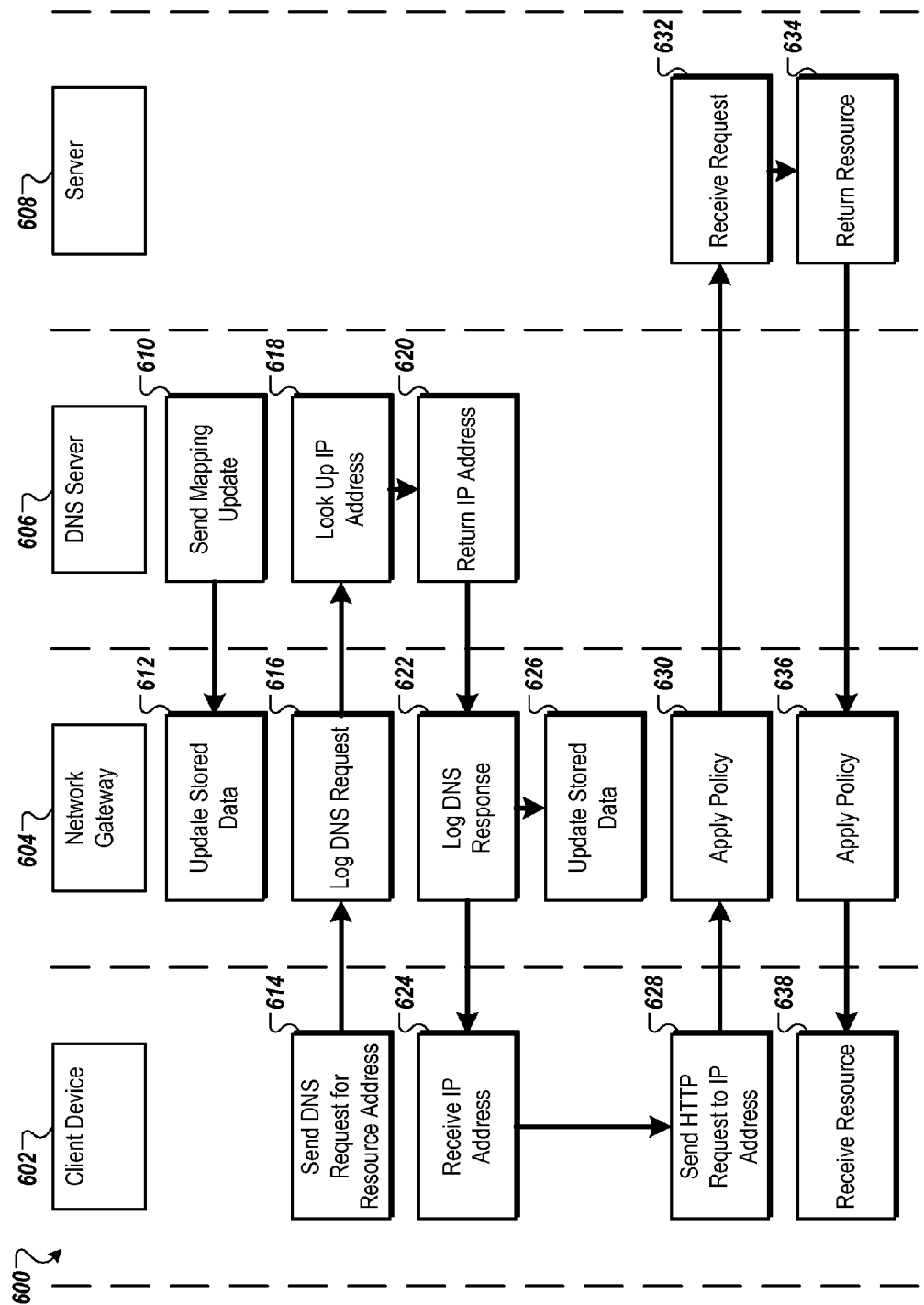
FIG. 6 is a swim-lane diagram of an example process for keeping a mapping of domain names to IP addresses

FIG. 6 is a swim-lane diagram of an example process 600 for keeping a mapping of domain names to IP addresses. The process 300 is described with reference to a particular set of components. However, other components, including and not limited the components of FIGS. 2-5, can be used to perform the process 600 or a similar process.

A DNS server 606 generates a mapping update and sends the mapping update to a network gateway 604 (610). For example, the DNS server can generate a mapping update that contains data that identifies a new resource, that identifies one or more new IP addresses, and that associates the new resource with one or more new IP addresses. The mapping update my take the format of established messages, such as a DNS response, or may take a custom format. The DNS server 606 may generate and send the mapping update in response to an input (e.g., a request from the network gateway 604), at regular or irregular intervals (e.g., daily, when system resources are free) or on another schedule.

The network gateway 604 receives the mapping update and updates stored data (612). For example, the network gateway 604 may maintain data that identifies a set of one or more resources to which a policy of a network applies, and identifies a set of one or more stored Internet Protocol (IP) addresses, and associates each resource in the set with one or more IP addresses in the set of IP addresses. The network gateway can examine the mapping update to determine if any of the contents are not already stored in the data of the gateway. If any of the contents are new, the network gateway can update the stored data to include the new resource, the new IP address or addresses, and/or update the associations to add in the contents of the mapping update.

A client device 602 generates and sends a DNS request for a resource address to the DNS server 606 (614). For example, a user of the client device 602 may enter a uniform resource locator (URL) address into an address bar of a web browser application. In response, the web browser application can generate a DNS request with the entered URL and send the DNS request to the DNS server, via the network gateway 604.

The network gateway 604 logs the DNS request and routes the DNS request to the DNS server 606 (616). For example, before, after, or as the network gateway 604 routes the DNS request to the DNS server 606, the network gateway 604 can log the DNS request. This log may include, for example, an identifier of the client device 602, the URL of the request, a timestamp, or other appropriate data.

The DNS server 606 receives the DNS request and looks up an IP address matching the requested resource address (618), and the DNS server 606 returns the IP address to the client device 602 (620). For example, the DNS server may query another DNS server for an IP address that matches the URL in the request, and may generate a DNS response with that IP address.

The network gateway 604 logs the DNS response and routes the DNS response to the client device 602 (622). For example, before, after, or as the network gateway 604 routes the DNS response to the client device 602, the network gateway 604 can log the DNS request. This log may include, for example, an identifier of the client device 602, the URL of the request, the IP address of the response, a time to live (TTL) value, a timestamp, or other appropriate data. The client device receives the IP address in the DNS response (624).

The network gateway updates the stored data (626). For example, the network gateway 604 can match the DNS response with the DNS request in order to update the stored data, or can use the data contained within the DNS response to update the stored data. The network gateway can, for example, determine if the data from the DNS messages contains a resource, IP address, or mapping that is not already stored. In response, the network gateway 604 can update the set of resources with the DNS message's resource, the set of IP addresses with the DNS message's IP address, and/or update the associations between the resources and the set of IP addresses.

The client device generates and sends an HTTP request to the IP address (628). For example, in response to receiving the DNS response (624), the web browser of the client device 602 can generate an HTTP request that requests the resource at the IP address returned by the DNS response. In some cases, this request may be a hypertext transport protocol secure (HTTPS) request or another type of encrypted request.

The network gateway 604 intercepts the HTTP request and applies a policy of the network to the HTTTP request (630). The server 608 receives the HTTP request (632) and returns the requested resource (634). The network gateway 604 intercepts the return message and applies a policy of the network (636). The client device 602 receives the requested resource (638).

For example, the network gateway can intercept the HTTP request and HTTP response and compare the IP address with the stored IP addresses in the network gateway 604. If there is a match, the network gateway 604 can identify a particular resource in the set of stored resources that is associated with the requested IP address, and identify a particular policy, or policies, associated with the particular resource. The network gateway 604 can apply the identified policy or policies to the HTTP request.

The network gateway 604 may determine that the IP address is shared by two domains (e.g., a file hosting service and web email client service offered by the same company). One policy of the network specifies that all email traffic should be logged, and another policy of the network specifies that all file hosting traffic should be checked for malicious code. In this example, the HTTP request can be logged. Later, when a corresponding HTTP response is intercepted by the network gateway, the HTTP response can be logged and checked for malicious code.

Although a particular number, type, and order of operations are shown here, other numbers, types, and orders of operations are possible. For example, if the policy to apply to the HTTP request requires that the HTTP request be blocked, the network gateway 604 may be configured to drop the HTTP request instead of routing the HTTP request to the server 608. In some examples, only requests that have an applied policy are inspected. For example, the network gateway 604 may be configured such that the only messages that are inspected for policy application are those with an IP address that matches a stored IP address in the network gateway 604.

Figure 7:
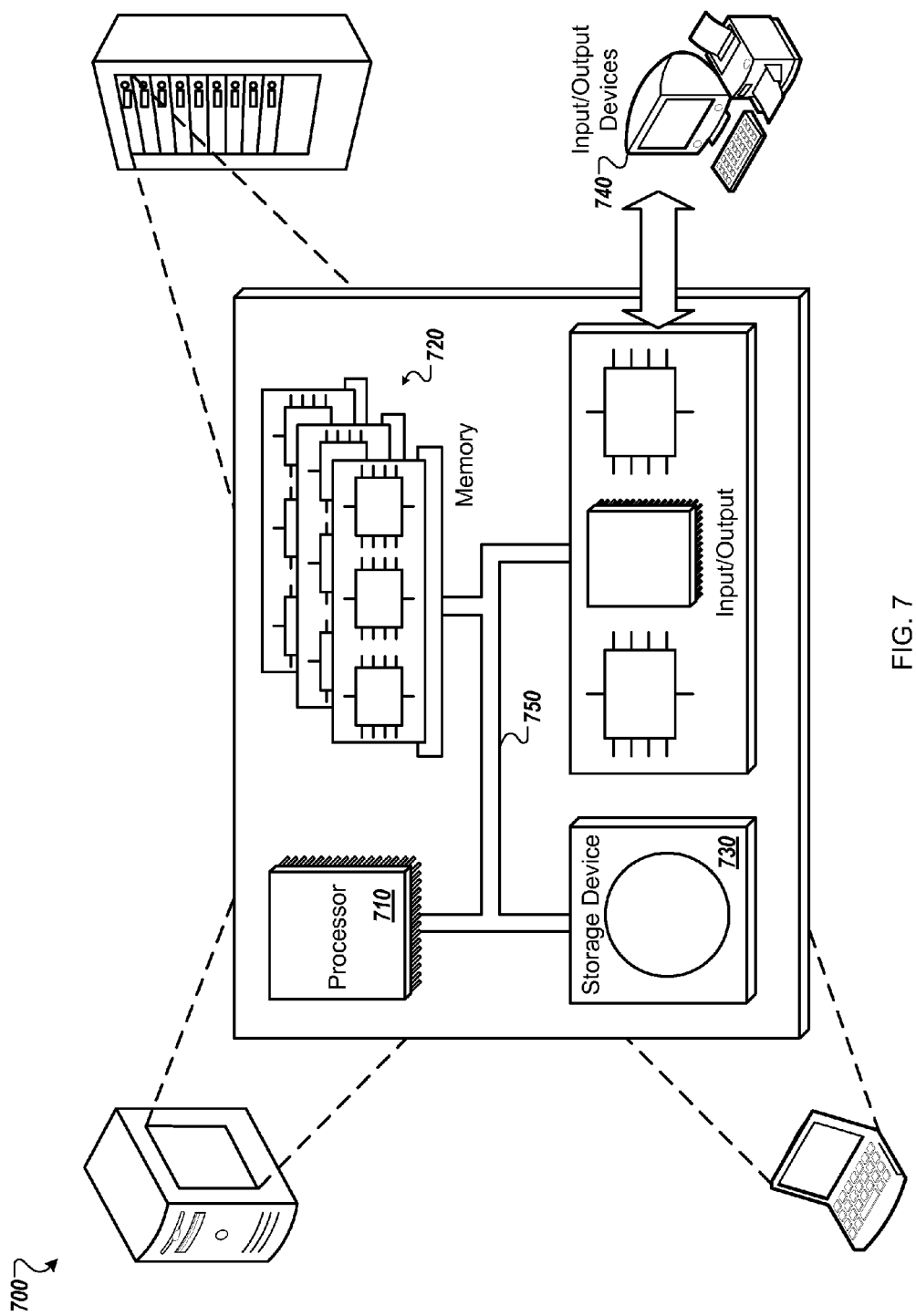
FIG. 7 is a schematic diagram that shows an example of a computing system.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

What is claimed is:

1. A method performed by data processing apparatus, the method comprising:

maintaining (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses;

registering, with a domain name system (DNS) server;

maintaining, by the DNS server, one or more IP addresses for each of the resources of the first data;

identifying, by the DNS server, a change to one or more of the IP addresses for one or more of the resources of the first data;

sending, by the DNS server, a message that is formatted according to a standard other than the DNS standard and comprising (i) fourth data that identifies two or more of the resources to which a policy of a network applies, (ii) fifth data that identifies one or more new IP addresses, and (iii) sixth data that associates each of the two or more resources in the fourth data with one or more of the new IP addresses;

receiving, from the DNS server, the message;

updating the second data, based on the fifth data, to include the one or more new IP addresses in the set of one or more IP addresses;

updating the third data, based on the sixth data, to update the associations between the set of resources and the set of IP addresses;

intercepting a request from a client device on the network for a requested resource identified by a requested IP address;

determining that the requested IP address matches one of the IP addresses in the set of IP addresses;

identifying a particular resource in the set of resources that is associated with the requested IP address;

identifying a particular policy of the network that applies to the particular resource; and applying the particular policy to the request.

2. The method of claim 1, wherein to apply the particular policy to the request, the data processing apparatus are configured to inspect communication between the client and a server serving the requested resource.

3. The method of claim 1, wherein only request that have an applied policy are inspected.

4. The method of claim 1, wherein the DNS server is hosted on the network.

5. The method of claim 1, wherein the DNS server is under the same administrative control as the network.

6. The method of claim 1, the method further comprising:
monitoring DNS responses;
generating, from the monitored DNS responses, (i) seventh data that identifies a second new resource, and (ii) eighth data that identifies one or more second new IP addresses, and (iii) ninth data that associates the second new resource with one or more second new IP addresses;
updating the first data, based on the seventh data, to include the second new resource in the set of one or more resources;
updating the second data, based on the eighth data, to include the one or more second new IP addresses in the set of one or more IP addresses; and
updating the third data, based on the ninth data, to update the associations between the set of resources and the set of IP addresses.

7. The method of claim 6, wherein the DNS responses are received from DNS servers outside of the network.

8. The method of claim 1, wherein the data processing apparatus comprise a plurality of hardware devices, each hardware device including a separate processor and memory unit;
wherein a first hardware device is configured to:
route traffic to and from client devices on the network into and out of the network;
maintain (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses;
receive, from the DNS server, (i) fourth data that identifies a new resource, (ii) fifth data that identifies one or more new IP addresses, and (iii) sixth data that associates the new resource with one or more new IP addresses;
update the first data, based on the fourth data, to include the new resource in the set of one or more resources;
update the second data, based on the fifth data, to include the one or more new IP addresses in the set of one or more IP addresses;
update the third data, based on the sixth data, to update the associations between the set of resources and the set of IP addresses;
intercept a request from a client device on the network for a requested resource identified by a requested IP address;
determine that the requested IP address matches one of the IP addresses in the set of IP addresses;
identify a particular resource in the set of resources that is associated with the requested IP address;
identify a particular policy of the network that applies to the particular resource; and
wherein a second hardware device is configured to apply the particular policy to the request.

9. The method of claim 1, wherein the resource is identified in the first data by the resource's Uniform Resource Locator (URL).

10. The method of claim 1, wherein the DNS server transmits the message after interacting with one of the resources of the first data.

11. The method of claim 1, wherein the message is formatted according to a custom standard.

12. The method of claim 1, wherein the message is sent by the DNS server in response to passage of a time interval.

13. The method of claim 1, wherein the message is sent by the DNS server in response to a request from a network gateway.

14. A method performed by data processing apparatus, the method comprising:
maintaining information including (i) a set of one or more resources to which a network policy applies, and (ii) a set of one or more Internet Protocol (IP) addresses, wherein each resource is associated with one or more of the IP addresses;
registering, with a domain name system (DNS) server, the set of one or more resources;
maintaining, by the DNS server, one or more IP addresses for each of the resources;
identifying, by the DNS server, a change to one or more of IP addresses for one or more of the resources of the first data;
sending, by the DNS server, a message that is formatted according to a standard other than the DNS standard and comprising (i) two or more of the one or more resources of the set of resources, or (ii) two or more new IP addresses, or (iii) both two or more of the resources of the set of resources and one or more new IP addresses, wherein each new IP address is associated with one of the one or more resources in the set of one or more resources;
receiving, from the DNS server, the message;
updating the maintained information based on the message;
receiving a request from a client device on the network for a requested resource identified by a requested IP address;
determining that the requested IP address matches one of the IP addresses in the set of one or more IP addresses;
identifying a particular resource associated with the matched IP address;
identifying a particular network policy applies; and
applying the identified particular network policy to the received request.

15. The method of claim 14, wherein to apply the particular policy to the request, the data processing apparatus are configured to inspect communication between the client and a server serving the requested resource.

16. The method of claim 14, wherein only request that have an applied policy are inspected.

17. The method of claim 14, wherein the DNS server is hosted on the network.

18. The method of claim 14, wherein the DNS server is under the same administrative control as the network.

19. The method of claim 14, the method further comprising:
monitoring DNS responses;
generating, from the monitored DNS responses, data identifying (i) a new resource, or (ii) one or more new IP addresses, or (iii) both a new resource and one or more new IP addresses, wherein each new IP address is associated with either a resource in the set of one or more resources, or the new resource;
updating the maintained information based on the data generated from the DNS responses.

20. The method of claim 19, wherein the DNS responses are received from DNS servers outside of the network.

21. The method of claim 14, wherein the data processing apparatus comprise a plurality of hardware devices, each hardware device including a separate processor and memory unit;
wherein a first hardware device is configured to:
route traffic to and from client devices on the network into and out of the network; and
maintain information including (i) a set of one or more resources to which a network policy applies, and (ii) a set of one or more Internet Protocol (IP) addresses, wherein each resource is associated with one or more of the IP addresses;
receive, from the DNS server, data identifying (i) a new resource, or (ii) one or more new IP addresses, or (iii) both a new resource and one or more new IP addresses, wherein each new IP address is associated with either a resource in the set of one or more resources, or the new resource;
update the maintained information based on the data received from the DNS;
receive a request from a client device on the network for a requested resource identified by a requested IP address;
determine that the requested IP address matches one of the IP addresses in the set of one or more IP addresses;
identify a particular resource associated with the matched IP address; and
identify a particular network policy; and
wherein a second hardware device is configured to apply the particular policy to the request.

22. The method of claim 14, wherein the resource is identified in the information by the resource's Uniform Resource Locator (URL).

23. The method of claim 14, wherein the DNS server transmits the message after interacting with one of the resources of the set of one or more resources.

24. The method of claim 14, wherein the message is formatted according to a custom standard.

25. The method of claim 14, wherein the message is sent by the DNS server in response to passage of a time interval.

26. The method of claim 14, wherein the message is sent by the DNS server in response to a request from a network gateway.

27. A system comprising:
one or more processors configured to execute computer program instructions; and
computer storage media encoded with computer program instructions that, when executed by one or more processors, cause data processing apparatus to perform operation comprising:
maintaining (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses;
registering, with a domain name system (DNS) server, the first data;
maintaining, by the DNS server, one or more IP addresses for each of the resources of the first data;
identifying, by the DNS server, a change to one or more of the IP addresses for one or more of the resources of the first data;
sending, by the DNS server, a message that is formatted according to a standard other than the DNS standard and comprising (i) fourth data that identifies two or more of the resources to which a policy of a network applies, (ii) fifth data that identifies one or more new IP addresses, and (iii) sixth data that associates each of the two or more resources in the fourth data with one or more of the new IP addresses;
receiving, from the DNS server, the message;
updating the second data, based on the fifth data, to include the one or more new IP addresses in the set of one or more IP addresses;
updating the third data, based on the sixth data, to update the associations between the set of resources and the set of IP addresses;
intercepting a request from a client device on the network for a requested resource identified by a requested IP address;
determining that the requested IP address matches one of the IP addresses in the set of IP addresses;
identifying a particular resource in the set of resources that is associated with the requested IP address;
identifying a particular policy of the network that applies to the particular resource; and
applying the particular policy to the request.

28. The system of claim 27, wherein applying the particular policy to the request comprises inspecting communication between the client and a server serving the requested resource.

29. The system of claim 27, wherein only request that have an applied policy are inspected.

30. The system of claim 27, wherein the DNS server is hosted on the network.

31. The system of claim 27, wherein the DNS server is under the same administrative control as the network.

32. The system of claim 27, the operations further comprise:
monitoring DNS responses;
generating, from the monitored DNS responses, (i) seventh data that identifies a second new resource, and (ii) eighth data that identifies one or more second new IP addresses, and (iii) ninth data that associates the second new resource with one or more second new IP addresses;
updating the first data, based on the seventh data, to include the second new resource in the set of one or more resources;
updating the second data, based on the eighth data, to include the one or more second new IP addresses in the set of one or more IP addresses; and
updating the third data, based on the ninth data, to update the associations between the set of resources and the set of IP addresses.

33. The system of claim 32, wherein the DNS responses are received from DNS servers outside of the network.

34. The system of claim 27, wherein the data processing apparatus comprise a plurality of hardware devices, each hardware device including a separate processor and memory unit;
wherein a first hardware device is configured to:
route traffic to and from client devices on the network into and out of the network;
maintain (i) first data that identifies a set of one or more resources to which a policy of a network applies, and (ii) second data that identifies a set of one or more stored Internet Protocol (IP) addresses, and (iii) third data that associates each resource in the set with one or more IP addresses in the set of IP addresses;

receive, from the DNS server, (i) fourth data that identifies a new resource, (ii) fifth data that identifies one or more new IP addresses, and (iii) sixth data that associates the new resource with one or more new IP addresses;

update the first data, based on the fourth data, to include the new resource in the set of one or more resources;

update the second data, based on the fifth data, to include the one or more new IP addresses in the set of one or more IP addresses;

update the third data, based on the sixth data, to update the associations between the set of resources and the set of IP addresses;

intercept a request from a client device on the network for a requested resource identified by a requested IP address;

determine that the requested IP address matches one of the IP addresses in the set of IP addresses;

identify a particular resource in the set of resources that is associated with the requested IP address;

identify a particular policy of the network that applies to the particular resource; and wherein a second hardware device is configured to apply the particular policy to the request.

35. The system of claim 27, wherein the resource is identified in the first data by the resource's Uniform Resource Locator (URL).

36. The system of claim 27, wherein the DNS server transmits the message after interacting with one of the resources of the first data.

37. The system of claim 27, wherein the message is formatted according to a custom standard.

38. The system of claim 27, wherein the message is sent by the DNS server in response to passage of a time interval.

39. The system of claim 27, wherein the message is sent by the DNS server in response to a request from a network gateway.

* * * * *